United States Patent [19]

Van der Valk

[11] 4,327,372
[45] Apr. 27, 1982

[54] ENCODING CIRCUIT FOR A SECAM COLOR TELEVISION TRANSMITTER

[75] Inventor: Nicolaas J. L. Van der Valk, Breda, Netherlands

[73] Assignee: U.S. Philips Corporation, New York, N.Y.

[21] Appl. No.: 157,751

[22] Filed: Jun. 9, 1980

[30] Foreign Application Priority Data

Jun. 27, 1979 [NL] Netherlands ........................ 7904985

[51] Int. Cl.³ ............................................. H04N 9/40
[52] U.S. Cl. .................................................... 358/14
[58] Field of Search ................... 358/4, 11, 12, 14, 25, 358/23

[56] References Cited

U.S. PATENT DOCUMENTS 3,716,656 2/1973 Lambert .............................. 358/14
3,984,863 10/1976 Fessard ................................ 358/25
4,081,827 3/1978 Hipwell ............................... 358/14

FOREIGN PATENT DOCUMENTS 2371111 6/1978 France ................................ 358/14

Primary Examiner—Michael A. Masinick
Attorney, Agent, or Firm—Thomas A. Briody; William J. Streeter; Laurence A. Wright

[57] ABSTRACT

An encoding circuit for a SECAM color television transmitter having a frequency modulator circuit for a modulating signal which comprises two color difference signals which follow one another line-sequentially and are controlled by means of two phase control loops and two reference signal generators. A first reference signal generator has one of the reference frequencies whereas the frequency of the signal generated by the second reference signal generator is a harmonic of the line frequency. The phase control loop to which the second reference signal generator is connected comprises a sample and hold circuit which is operative at field frequency.

13 Claims, 1 Drawing Figure

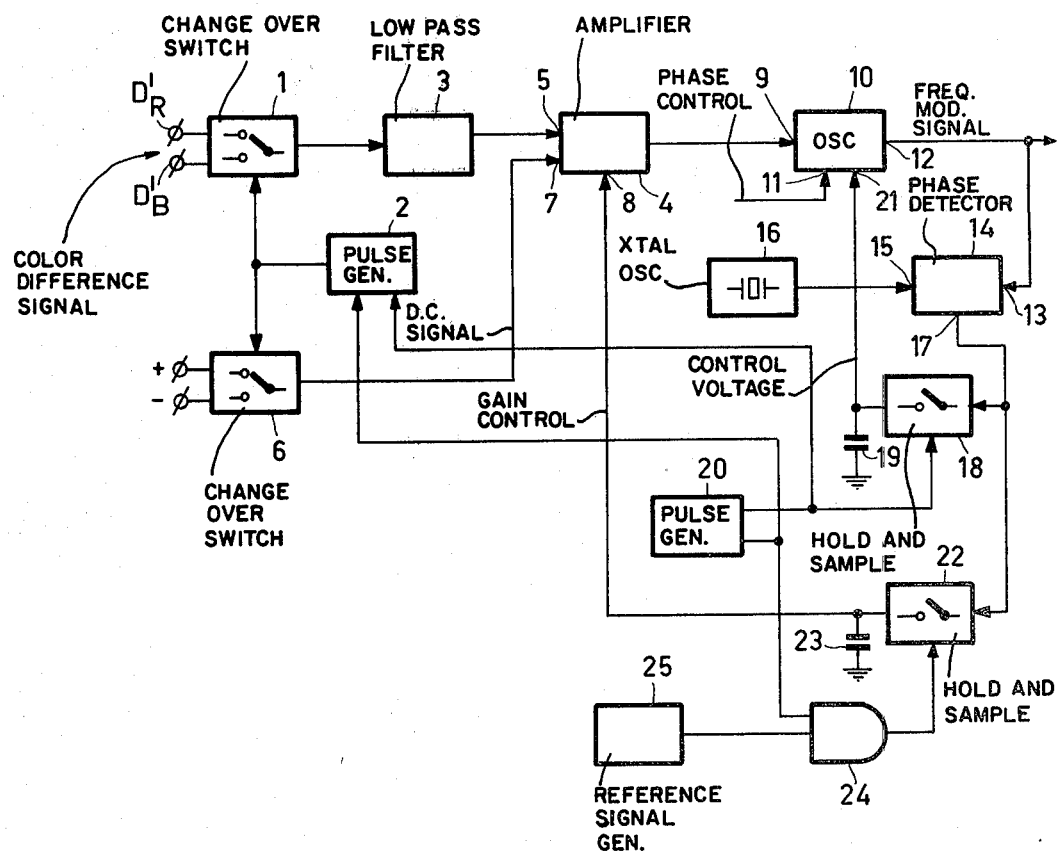

ENCODING CIRCUIT FOR A SECAM COLOR TELEVISION TRANSMITTER

The invention relates to an encoding circuit for a SECAM colour television transmitter, comprising a pulse generator for generating a signal of the line and a signal of the field frequency, a frequency modulator circuit having a frequency-modulatable oscillator for converting a modulating signal containing two colour difference signals which follow one another line-sequentially, each having a direct current component added thereto, into a frequency-modulated signal having a first reference frequency at a first value of the first colour difference signal and a second reference frequency at a second value of the second colour difference signal, a first phase control loop for generating a first control voltage for the frequency modulator circuit and including a first sample and hold circuit, said first sample and hold circuit being operative, in a time interval in which the first colour difference signal has the first value, a first reference signal generator for generating a signal having the first reference frequency being connected to the first phase control loop, and further comprising a second phase control loop for generating a second control voltage for the frequency modulator circuit and including a second sample and hold circuit, said second sample and hold circuit being operative at field frequency and in a time interval in which the second colour difference signal has the second value, a second reference signal generator being connected to the second phase control loop.

BACKGROUND OF THE INVENTION

Coding circuits are known from U.S. Pat. No. 3,984,863. In this circuit the frequency of the frequency-modulated signal occurs during a time interval in which the colour difference signal is zero and is made equal by the action of the first phase control loop to the so-called quiescent frequency, that is the frequency of the relevant reference signal generator. This is effected line-sequentially, that is to say, the signal of the oscillator assumes the relevant quiescent frequency, namely 4.40625 MHz or 4.250 MHz, respectively, at the beginning of each line period. To this end, a signal which has alternately these frequencies and which is compared with the frequency-modulated signal is applied to a phase detector. This results in a control voltage. This control voltage is applied to the frequency modulator circuit for controlling the instantaneous frequency of the frequency-modulated signal, causing this frequency to have the correct quiescent frequency, at least during the said time interval.

Thus, the known circuit accomplishes the stabilization of both quiescent frequencies, namely by means of two reference signal generators generating signals of these frequencies with a very high accuracy. The said patent specification proposes to provide a similar stabilization by means of a different construction by controlling a direct current component which is added to each colour difference signal. A square-wave signal is therefore added to the modulating signal, this signal having half the line frequency and assuming alternately the values corresponding with the relevant quiescent frequency. The amplitude of this signal is controlled, for which the two reference signal generators are still necessary.

In a still further construction only one accurate reference signal generator is required because the amplitude of the square-wave signal remains constant with very high accuracy.

It is an object of the invention to provide an encoding circuit of the above-defined type wherein one accurate reference signal generator is required for modulation, whereas the signal of an existing reference signal generator is used for the second control, which means a not inconsiderable saving. To this end, the encoding circuit according to the invention is characterized in that the frequency of the signal generated by the second reference signal generator is a harmonic of the line frequency and in that the second sample and hold circuit is operative for a period of time which is long relative to one period of the signal generated by the second reference signal generator.

SUMMARY OF THE INVENTION

The invention is based on the recognition of the fact that an encoding circuit always comprises a generator for generating signals of line frequency, which generator is very accurate and stable and can be used to obtain a frequency-modulated signal having two stabilized frequencies.

Preferably, the encoding circuit according to the invention is characterized in that the first value of the first and the second value of the second colour difference signal are zero and that the frequency of the signal generated by the second reference signal generator is the tenth harmonic of the line frequency or a subharmonic of said tenth harmonic, it also being characterized in that the second sample and hold circuit is operative in the field synchronizing-equalizing period.

An encoding circuit according to the invention wherein the first sample and hold circuit is operative at field frequency, may be characterized in that the first sample and hold circuit is operative in the field synchronizing-equalizing period and that the second sample and hold circuit is operative after the first sample and hold circuit, that the first sample and hold circuit is operative during the pre-equalization period and the second sample and hold circuit during the field synchronizing and post-equalizing periods and that the direct current component added to the appropriate colour difference signal is substantially constant during the period of time in which the relevant sample and hold circuit is operative.

The second reference signal generator may be of a simple construction. To this end, the encoding circuit according to the invention may be characterized in that it is provided with a circuit for multiplying the line frequency by an integer, or with a third phase control loop for maintaining the frequency of the second reference signal generator substantially constant, a source of a signal of line frequency being connected to said third phase control loop. Should the encoding circuit comprise a plurality of frequency dividing circuits for generating the line frequency, it may be characterized in that the said frequency dividing circuits also provide the second reference signal generator.

An encoding circuit according to the invention wherein the first phase control loop comprises a phase detector for comparing the frequency of the frequency-modulated signal with the first reference frequency may be characterized in that the phase detector forms part of the second phase control loop and that the second sample and hold circuit is operative by means of the signal generated by the second reference signal generator and during the occurrence of a pulse at field frequency or that the second phase control loop comprises a mixer circuit, for example a second phase detector, for mixing the frequency of the output signal of the first phase detector with the frequency of the second reference signal generator, or that the second phase control loop comprises a third sample and hold circuit, the second sample and hold circuit being operative by means of a pulse at field frequency and the third sample and hold circuit being operative by means of a signal having the frequency of the second reference signal generator.

BRIEF DESCRIPTION OF THE DRAWING

The invention will now be further explained by way of non-limitative example with reference to the accompanying FIGURE, this FIGURE showing a block-schematic diagram of the relevant portion of an encoding circuit according to the invention.

Referring to FIG. 1, reference numeral 1 denotes a change-over switch having two input terminals. A colour difference signal D'$_R$ is applied to one input terminal, whereas a colour difference signal D'$_B$ is applied to the other input terminal. Switch 1 is operated by a switching signal of half the line frequency originating from a pulse generator 2, and applies a line sequential signal to an input terminal 5 of an amplifier stage 4 via a low-pass filter 3. By means of a change-over switch 6, which is operated by the same switching signal as switch 1 a d.c. voltage is applied line-sequentially to another input terminal 7 of stage 4. Stage 4 comprises an amplifier whose gain can be controlled by means of a control voltage which can be applied to a further input terminal 8. In addition to a changeable gain, the signal is subjected in stage 4 to a frequency-dependent amplitude correction and to a limiting operation, both in the manner prescribed by the SECAM standard.

The output signal of amplifier stage 4 is applied to a modulation signal input terminal 9 of an oscillator 10. The phase of this oscillator is reversed in known manner every third line period and every second field period by a signal applied to an input terminal 11. A frequency-modulated signal whose phase is reversed every third line and every second field and which is further processed in known manner is obtained at an output terminal 12 of oscillator 10. It is also applied to an input terminal 13 of a phase detector 14, to a further input terminal 15 of which a reference signal generated by a crystal oscillator 16 is applied. The signal available at an output terminal 17 of phase detector 14 is applied to a first sample and hold circuit comprising a switch 18 and a capacitor 19. Switch 18 is operated by a switching signal derived from a pulse generator 20, a control voltage which is applied to an input terminal 21 of oscillator 10 for controlling the frequency thereof being present across capacitor 19.

The signal at terminal 17 is also applied to a second sample and hold circuit comprising a switch 22 and a capacitor 23. Switch 22 is operated by a switching signal, received from the output terminal of an AND-gate 24. An input terminal of gate 24 is connected to generator 20, whereas a second input terminal is connected to a reference signal generator 25. A control voltage which is applied to terminal 8 for controlling the gain of the amplifier in stage 4 is present across capacitor 23.

Pulse generator 20 generates switching signals of the field frequency. The switching pulse applied to switch 18 has a duration of 2.5 line periods and occurs at the beginning of the field blanking period, simultaneously with the period in which the pre-equalizing pulses occur in the synchronizing signal. The switching pulse applied to gate 24 has a duration of 5 line periods and occurs immediately after the first-mentioned switching pulse, that is to say simultaneously with the period in which the field synchronizing signal and the post-equalizing pulses occur. Both switching pulses are also applied to generator 2 for influencing the signal generated thereby in such a way that change-over switches 1 and 6 are, during the occurrence of the first switching pulse, in the position corresponding with a red line, whereas they are in the position corresponding with the blue line during the occurrence of the second switching pulse.

During the red lines the red colour difference signal D'$_R$ is applied to stage 4, but during the pre-equalizing period this signal is zero, so that only the constant level signal of change-over switch 6 is applied to stage 4. After modulation, a signal must be obtained which has the quiescent frequency for red $f_{OR}=4.40625$ MHz. To this end, the signal of oscillator 16 has the frequency $f_{OR}$. The output voltage of phase detector 14, which is a measure of the difference between the frequencies applied thereto is measured during the occurrence of the switching pulse applied to switch 18, and is thereafter stored in capacitor 19 until the next sampling interval. The control voltage produced across capacitor 19 adjusts oscillator 10 to frequency $f_{OR}$. When the frequency of the frequency-modulated signal has become equal to $f_{OR}$, then the control voltage is a constant d.c. voltage.

During the blue lines, the blue chrominance signal D'$_B$ is applied to stage 4 but during the occurrence of the second switching pulse generated by generator 20, this signal is zero, so that only the constant-level signal of change-over switch 6 is applied to stage 4. After modulation, a signal must be obtained which has the quiescent frequency for blue $f_{OB}=4.250$ MHz. To this end, the signal of generator 25 is a square-wave signal having a frequency of 156.25 kHz, that is to say ten times the line frequency (French standard) i.e. the difference between the frequencies $f_{OR}$ and $f_{OB}$ prescribed by the SECAM standard. The output signal of gate 24 consists of a train of switching pulses having a repetition frequency of 156.25 kHz, the pulse train having a repetition rate of 50 Hz, being the field frequency (French standard). During the occurrence of the second switching pulse of generator 20, the signal at terminal 12 has a substantially constant frequency. The output voltage at terminal 17 of detector 14 has, consequently, a frequency which is equal to the difference between $f_{OR}$ and the frequency of the signal at terminal 12. A voltage, the frequency of which is the difference between the frequency of the voltage at terminal 17 and the frequency of generator 25 is produced across capacitor 23. When the second switching pulse of generator 20 is constant until the next sampling interval. The control voltage produced across capacitor 23 controls the gain of the amplifier in stage 4 in such a way that the signal generated by oscillator 40 during the sampling interval has the frequency $f_{OB}$. When this situation has been obtained, the control voltage is a constant d.c. voltage. In response, to this control, all frequencies of the output signal at terminal 12 of the frequency modulator circuit provided by the stage 4 and oscillator 10 are stabilized, for example against temperature effects. All this is further described in applicant's non pre-published Netherlands patent application No. 7904884.

Both signals applied during the sampling interval of switch 22 to this switch have a comparatively low frequency, namely 156.25 kHz and a frequency, which is at first substantially equal thereto and thereafter fully equal. This is the reason why a sampling interval, 5 line periods in the embodiment described, which is long relative to the period of the signal of generator 25, is preferred. A similar situation is not necessary for the phase control loop, which comprises the sample and hold circuit 18, 19 and in which signals having a frequency of 4,40625 MHz are operative in the synchronized state. A sampling at line frequency may, for example, be effected in known manner. If both sampling procedures are effected at the field frequency, they should preferably take place in the described sequence, that is to say first with switch 18 and thereafter with switch 22, which ensures an improved stability. The first line periods of the field blanking period have been chosen for this purpose because then the colour difference signals are definitely zero, in contrast to the lines after the post-equalizing period, which may contain colour information for test lines, identification lines etc. In its turn, this choice is related to the fact that stabilization of frequencies $f_{OR}$ and $f_{OB}$ is opted for. It will be clear that other frequencies and, consequently, other sampling intervals might have been chosen. An example hereof are the frequencies 4,756 MHz and 3.900 MHz, respectively, which occur during a portion of the identification lines for red and blue, respectively, during the field frequency period. As, however, it is of the utmost importance that the frequencies corresponding to the black level are constant, preference should be given to the choice indicated above, which has the additional advantage that the switching pulses of 2.5 and 5 line periods are useful for the synchronizing signal. Since the sampling periods are not infinitely short it is not necessary for the output voltages of the two sample and hold circuits to be smoothed additionally. The sole requirement imposed on capacitors 19 and 23 is that they can preserve their charge between two successive sampling intervals, which can be improved by incorporating a separating stage in the lead between the capacitor and terminal 21 and 8, respectively.

Oscillator 10 is a self-oscillating frequency modulator, which may be constructed in known manner, for example as described in applicant's Netherlands patent application No. 7,512,257. Phase detector 14 and the two sample and hold circuits are also of a known type, whereas crystal oscillator 16 may have been locked in the line frequency in known manner. The above-mentioned Dutch patent application No. 7,904,884 describes a possible construction of amplifier stage 4. In this connection it should be noted that the fact, that the gain of the amplifier in stage 4 is controlled is not essential for the present invention. The control voltage obtained across capacitor 23 can be used in known manner for the control of the amplitude of the square-wave voltage applied to terminal 7.

Reference signal generator 25 need not be a separate, accurate generator, the reason being that the encoding circuit of which the circuit of the Figure forms part comprises a generator (not shown) for the generation of a signal of line frequency, the frequency of which is very stable and accurate. A tenth harmonic can be derived in a simple manner from this signal, namely by means of a frequency-multiplying circuit. Alternatively, the encoding circuit may comprise a high-frequency crystal oscillator from which signals of line and field frequency can be derived by means of frequency dividing circuits. The dividing circuits may be chosen so that a signal of ten times the line frequency is available. Alternatively, generator 25 may comprise an oscillator generating a signal of ten times the line frequency in the synchronized state of the phase control loop to which the line synchronizing pulses are applied.

The foregoing also holds for the case that a different frequency than $f_{OB}$ is stabilized by means of the phase control loop comprising the sample and hold circuit 22, 23, so that the difference with respect to frequency $f_{OR}$ is not ten times the line frequency. The generation of the reference frequency operative in the said loop will be simple, on the condition that this difference is equal to an integral multiple of the line frequency. It should be noted that the frequency of generator 25 need not necessarily be equal to the difference with the first reference frequency: a sub-harmonic thereof may also be used. If this difference is equal to ten times the line frequency, then the frequency of the signal generated by the generator 25 may be equal to twice and five times, respectively, the line frequency so that the sampling procedure by means of switch 22 takes place in the synchronized state of the loop every fifth and second period, respectively.

As during locking-in of the loop, two signals having different frequencies are applied to switch 22, frequency mixing is obtained by means thereof so that a d.c. voltage is produced in the synchronized state of the loop. The same result can be obtained by applying the voltage at terminal 17 to a mixer circuit, for example a phase detector, for mixing the frequency of these voltage with the frequency of generator 25. The mixing product is then sampled at field frequency for generating the control voltage at terminal 8, whereas gate 24 can be omitted. This sampling procedure may also be effected in the lead between terminal 17 and the phase detector just mentioned. Alternatively, a cascade arrangement of two sample and hold circuits may be used, the voltage at terminal 7 being applied to the first sample and hold circuit operative at field frequency, whereas the second sample and hold circuit samples the voltage obtained by means of a harmonic of the line frequency.

What is claimed is:
1. An encoding circuit for a SECAM colour television transmitter comprising:
   a pulse generator for generating a line signal frequency and a field signal frequency, a frequency modulator circuit switchably connected to said pulse generator and comprising a frequency-modulatable oscillator for converting a modulating signal containing two color difference signals which follow one another line-sequentially each color difference signal having a direct current component added thereto, into a frequency-modulated signal having a first reference frequency at a first value of the first colour difference signal and a second reference frequency at a second value of the second colour difference signal,
   a first phase control loop connected to said frequency modulator circuit for generating a first control voltage for said frequency modulator circuit and including a first sample and hold circuit, said first sample and hold circuit being operative in a time interval in which said first color difference signal has said first value, a first reference signal generator connected to said first phase control loop for generating a signal having the first reference frequency, and further comprising a second phase control loop connected to said frequency modulator circuit for generating a second control voltage for said frequency modulator circuit and including a second sample and hold circuit, said second sample and hold circuit being operative at field frequency and in a time interval in which said second color difference signal has said second value, a second reference signal generator being connected to said second phase control loop, so that the frequency of the signal generated by said second reference signal generator is a harmonic of the line frequency and so that the second sample and hold circuit is operative during a period of time which is long relative to one period of the signal generated by said second reference signal generator.

2. An encoding circuit as claimed in claim 1, wherein said first value of said first and said second value of said second color difference signal are zero and wherein the frequency of the signal generated by said second reference signal generator is the tenth harmonic of the line frequency or a sub-harmonic of said tenth harmonic.

3. An encoding circuit as claimed in claim 1, wherein said second sample and hold circuit is operative during the field synchronizing-equalizing period.

4. An encoding circuit as claimed in claim 3, wherein said first sample and hold circuit is operative at field frequency, wherein said first sample and hold circuit is operative during the field synchronizing-equalizing period and wherein said second sample and hold circuit is operative after the first sample and hold circuit.

5. An encoding circuit as claimed in claim 4, wherein said first sample and hold circuit is operative during the pre-equalizing period and said second sample and hold circuit is operative during the field snychronizing and post-equalizing periods.

6. An encoding circuit as claimed in claim 3, wherein the direct current component added to the appropriate color difference signal is substantially constant during the period of time in which the relevant sample and hold circuit is operative.

7. An encoding circuit as claimed in claim 1, comprising a circuit for multiplying the line frequency by an integer.

8. An encoding circuit as claimed in claim 1, comprising a plurality of frequency dividing circuits for generating the line frequency, wherein said frequency dividing circuits also provide the second reference signal generator.

9. An encoding circuit as claimed in claim 1, comprising a third phase control loop for maintaining the frequency of the second reference signal generator substantially constant, a source of line frequency signal being connected to said third phase control loop.

10. An encoding circuit as claimed in claim 1, the first phase control loop comprising a phase detector for comparing the frequency of the frequency-modulated signal with the first reference frequency, wherein said phase detector forms part of the second phase control loop.

11. An encoding circuit as claimed in claim 10, wherein second sample and hold circuit is operative by means of the signal generated by said second reference signal generator and during the occurrence of a pulse at field frequency.

12. An encoding circuit as claimed in claim 10, wherein said second phase control loop comprises a mixer circuit, for example a second phase detector, for mixing the frequency of the output signal of the first phase detector with the frequency of the second reference signal generator.

13. An encoding circuit as claimed in claim 10, wherein said second phase control loop comprises a third sample and hold circuit, the second sample and hold circuit being operative by means of a pulse at field frequency and the third sample and hold circuit being operative by means of a signal having the frequency of the second reference signal generator.

* * * * *